US008585912B2

(12) United States Patent
Guo et al.

(10) Patent No.: US 8,585,912 B2
(45) Date of Patent: Nov. 19, 2013

(54) SYSTEM, METHOD AND APPARATUS FOR BATCH VAPOR DEPOSITION OF ADHESION PROMOTER FOR MANUFACTURING DISCRETE TRACK MEDIA AND BIT-PATTERNED MEDIA, AND MONO-MOLECULAR LAYER LUBRICANT ON MAGNETIC RECORDING MEDIA

(75) Inventors: Xing-Cai Guo, Tracy, CA (US); Robert Waltman, Gilroy, CA (US); Tsai-Wei Wu, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 1076 days.

(21) Appl. No.: 12/177,950

(22) Filed: Jul. 23, 2008

(65) Prior Publication Data
US 2010/0018945 A1    Jan. 28, 2010

(51) Int. Cl.
B44C 1/22    (2006.01)
(52) U.S. Cl.
USPC ............... 216/22; 216/54; 427/593; 427/748; 427/96.8
(58) Field of Classification Search
USPC .......... 216/22, 54; 427/593, 78, 96.8, 96.822, 427/54
See application file for complete search history.

(56) References Cited

U.S. PATENT DOCUMENTS

| | | |
|---|---|---|
| 4,882,197 A | 11/1989 | Matsudaira et al. |
| 4,920,919 A | 5/1990 | Matsudaira et al. |
| 5,562,965 A | 10/1996 | Gui et al. |
| 5,709,957 A | 1/1998 | Chiang et al. |
| 6,183,831 B1 | 2/2001 | Hughes et al. |
| 6,214,410 B1 | 4/2001 | Stirniman et al. |
| 6,830,600 B2 | 12/2004 | McLeod et al. |
| 7,300,823 B2 | 11/2007 | Franosch et al. |
| 2003/0185986 A1 * | 10/2003 | Ma et al. ........................ 427/282 |
| 2005/0050258 A1 | 3/2005 | Frommer et al. |
| 2006/0131265 A1 | 6/2006 | Samper et al. |
| 2007/0051697 A1 | 3/2007 | DiPietro et al. |
| 2007/0196673 A1 * | 8/2007 | Hancer et al. .................. 428/447 |

(Continued)

FOREIGN PATENT DOCUMENTS

| | | |
|---|---|---|
| JP | 59048833 | 3/1984 |
| JP | 60226019 | 11/1985 |

(Continued)

OTHER PUBLICATIONS

Carter, Kenneth R., et al, Contract Molding for Nanoscopic Pattern Transfer, http://www.pse.umass.edu/kcarter/images/polyprep431_403.pdf, 2002.

(Continued)

Primary Examiner — Binh X Tran

(57) ABSTRACT

A batch vapor deposition process for applying adhesion promoter during manufacturing of nanoimprinted discrete track media and bit-patterned media, and mono-molecular layer lubricant on magnetic recording media are disclosed. The adhesion promoter is simultaneously coated on both sides of numerous disk substrates, and minimal solution is wasted. In another step, the lubricant is applied at a uniform thickness that is on the order of a single molecular layer. The lubricant is also applied on the entire disk surfaces while processing multiple disks at a time. Batch processing increases throughput, and vapor lubricant reduces costs compared to conventional techniques. Limited air exposure controls bonding and monolayer adsorption guarantees uniformity.

14 Claims, 3 Drawing Sheets

(56) References Cited

U.S. PATENT DOCUMENTS

| | | |
|---|---|---|
| 2008/0050521 A1 | 2/2008 | Ma et al. |
| 2008/0216744 A1* | 9/2008 | Watanabe et al. ............. 118/719 |
| 2009/0135518 A1* | 5/2009 | Weller et al. .................. 360/110 |

FOREIGN PATENT DOCUMENTS

| | | |
|---|---|---|
| JP | 61227230 | 10/1986 |
| JP | 8180391 | 7/1996 |
| JP | 2003225612 | 8/2003 |

OTHER PUBLICATIONS

Nakamura, K., Organic Lubricant Evaporation Method, a New Lubricating Surface Treatment for Thin Film Magnetic Recording Media, IEEE Transactions on Magnetics, vol. MAG-20, No. 5, Sep. 1984.

Choi, Junho, et al., SElf-Assembled Monolayers as Lubricants for Magnetic Disk Drives, IEEE Transactions on Magnetics, vol. 41, No. 2, Feb. 2005.

"Vapour deposition of lubricant for disc files—depositing lubricant film of 100 angstroms during disc mfr. to replenish film on disc," Aug. 10, 1992, Research Disclosure, Publication No. RD 340075 A.

\* cited by examiner

SYSTEM, METHOD AND APPARATUS FOR BATCH VAPOR DEPOSITION OF ADHESION PROMOTER FOR MANUFACTURING DISCRETE TRACK MEDIA AND BIT-PATTERNED MEDIA, AND MONO-MOLECULAR LAYER LUBRICANT ON MAGNETIC RECORDING MEDIA

BACKGROUND OF THE INVENTION

1. Technical Field

The present invention relates in general to vapor deposition and, in particular, to an improved system, method and apparatus for batch vapor deposition of adhesion promoter for manufacturing imprinted discrete track media and bit-patterned media, and/or a mono-molecular layer of lubricant on magnetic recording media.

2. Description of the Related Art

The first step in the nanoimprinting process of discrete track media (DTM) or bit patterned media (BPM) is to apply an adhesion promoter (AP) onto the substrates. Without AP the resist material applied in the subsequent step would be peeled off from the substrate during the later release step. AP is normally applied through conventional spin-coating techniques. Spin-coating can only coat one side of the substrate at a time, and much of the expensive AP material is spun off and wasted during this inefficient process. Moreover, the throughput of spin-coating is limited to one substrate at a time. A more efficient process needs to be developed for coating both sides of a disk substrate at the same time, while using a minimal amount of AP material to reduce waste.

In a related matter, the areal density of magnetic recording media continues to increase. As a result, the thickness of the lubricant used to coat the media after the media is fabricated must become thinner to avoid affecting the performance of the media. Although currently not possible, the lubricant thickness is expected to approach the absolute minimum thickness of a single molecule of the lubricant (i.e., on the order of 6 to 8 Å). In the future, manufacturing processes will need to be capable of applying much thinner layers of lubricant to sustain the areal density requirements. At such minimal thicknesses, however, it is difficult to achieve uniformity and reproducibility using conventional liquid dipping processes, as the thickness-versus-concentration slope becomes steeper. Another drawback of the dipping process is its slow bonding kinetics due to air exposure after sputtering. In addition, the dipping process requires the use of a solvent, which further increases cost.

One known solution to these problems is vapor lubricant deposition, such as those disclosed in U.S. Pat. No. 6,183,831 to Hughes, and U.S. Pat. No. 6,830,600 to McLeod. In those processes, both sides of a single disk are exposed to a diffused lubricant vapor in a line of sight inside a vacuum chamber. Unfortunately, those processes produce excessive lubricant thicknesses. Additional drawbacks of such approaches are very low throughput and poor uniformity of lubricant thickness compared to dipping. Thus, an improved solution is needed for applying ultra-thin lubricant films on magnetic recording media.

SUMMARY OF THE INVENTION

Embodiments of a system, method and apparatus for batch vapor deposition of adhesion promoter for manufacturing nanoimprinted discrete track media and bit-patterned media, and/or a mono-molecular layer of lubricant on magnetic recording media are disclosed.

In one embodiment, a batch vapor deposition process is used to provide an adhesion promoter (AP) that simultaneously coats both sides of a plurality of disk substrates. For example, an entire cassette or multiple cassettes of the disk substrates may be processed at the same time. In one application, the AP is maintained at a selected temperature to control its vapor pressure. A cassette of disk substrates is located inside a vacuum chamber with exposure control valves for controlling exposure time. AP material consumption is minimal compared to conventional spin coating techniques.

In a separate step of other embodiments, a batch vapor deposition process is used to provide a lubricant at a uniform thickness that is on the order of a single molecular layer over the entire disk surfaces, while processing multiple cassettes of disks at a time. Batch processing increases throughput, and vapor lubricant reduces costs compared to conventional techniques. Limited air exposure controls bonding and monolayer adsorption guarantees uniformity.

In one application, the disks are transferred from the sputtering chamber on an evacuated conveyer to an isolation chamber, and then to an exposure chamber where they are arranged adjacent to vapor diffusing tubes. After controlled air exposure to limit lubricant bonding, the exposure chamber is evacuated and filled with lubricant vapor. Exposure time is controlled such that monolayer adsorption of lubricant reaches saturation at ambient (or controlled) disk temperature. Finally, the disks are unloaded from the exposure chamber and relocated for further processing, such as final tape polish (FTP; or pad burnish) and glide testing.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 1:
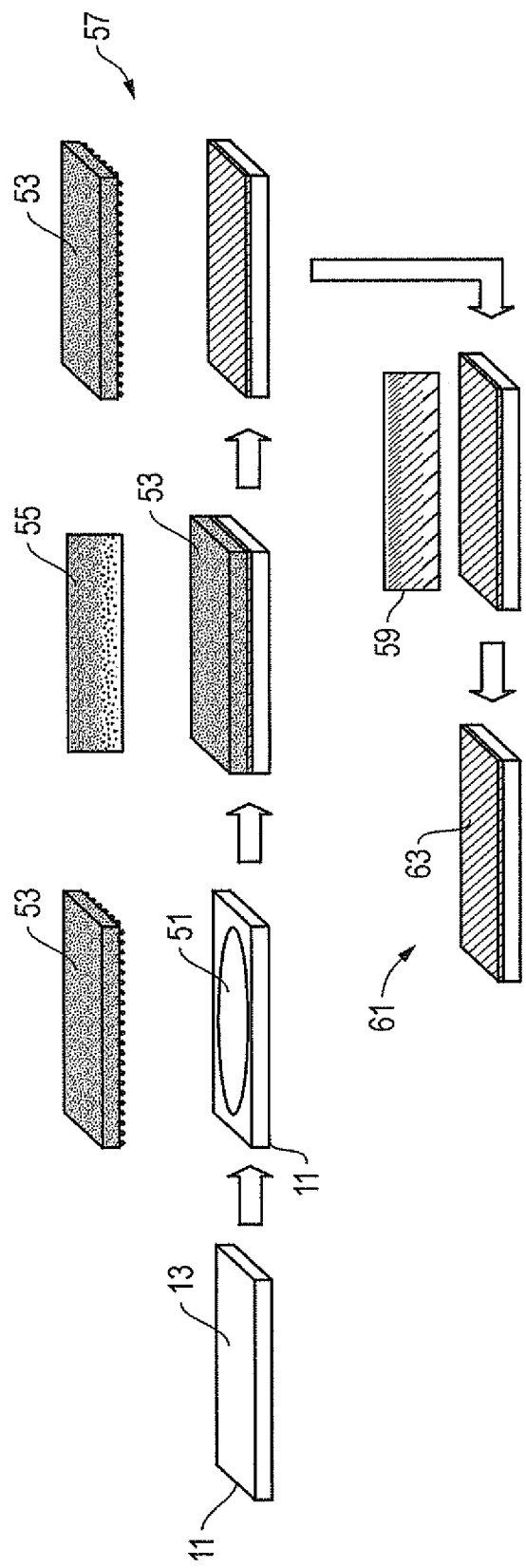
FIG. 1 is a schematic diagram of one embodiment of a method constructed in accordance with the invention.

Referring to FIGS. 1-5, embodiments of a system, method and apparatus for batch vapor deposition of adhesion promoter for manufacturing nanoimprinted discrete track media and bit-patterned media, and mono-molecular layer lubricant on magnetic recording media are disclosed. In one embodiment, the invention comprises a method of manufacturing magnetic recording media. For example, as shown in FIG. 1, the method may comprise providing disk substrates 11 and batch vapor depositing an adhesion promoter (AP) 13 on the disk substrates 11. After the AP 13 is deposited, the disk substrates 11 may be further processed, as will be described below with regard to FIG. 1, to manufacture and fabricate them into magnetic recording media. In addition, a lubricant may be batch vapor deposited on the magnetic recording media, as will be described herein with regard to FIG. 5. Advantageously, the lubricant is provided with a thickness on the order of a single molecule of the lubricant (e.g., approximately 6 to 8 Å).

Figure 3:
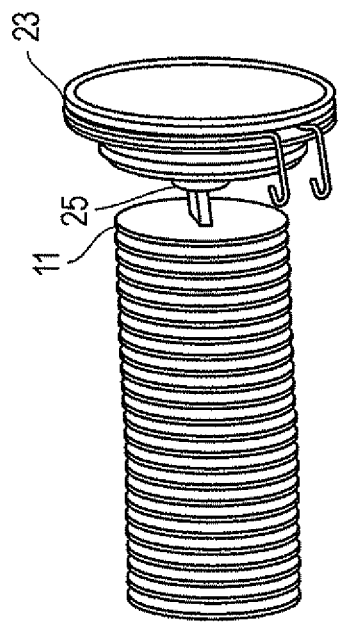
FIG. 3 is schematic diagram of a component of the batch vapor deposition process of FIG. 2, shown loaded with disk substrates, and is constructed in accordance with the invention.
Figure 4:
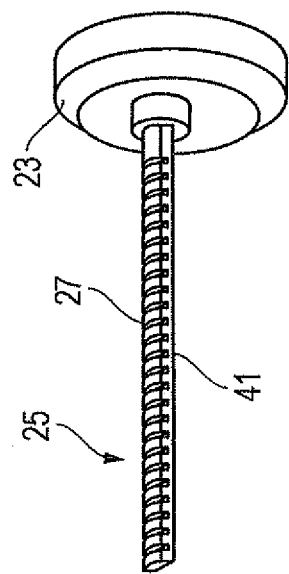
FIG. 4 is schematic diagram of a disk mandrel for the component of FIG. 3, shown unloaded, and is constructed in accordance with the invention.
Figure 2:
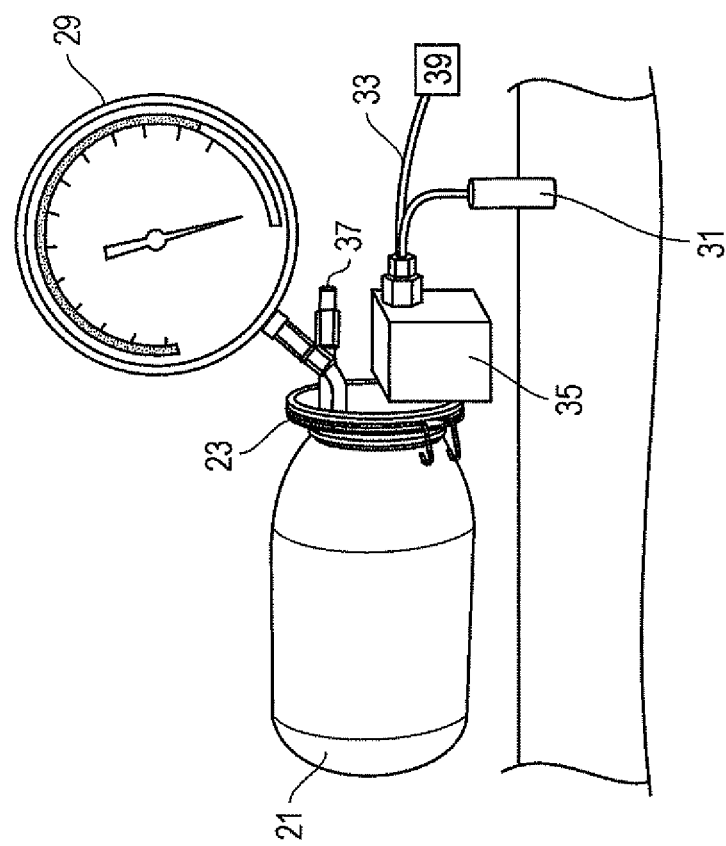
FIG. 2 is schematic diagram of a batch vapor deposition process for adhesion promoter for the method of FIG. 1 and is constructed in accordance with the invention.

As shown in FIGS. 2-4, the AP deposition step may comprise simultaneously coating both sides of the disk substrates 11 with the AP 13. FIG. 2 illustrates one embodiment of a system that may be used for the deposition process, including an evacuation chamber 21 having a base 23. A disk mandrel 25 (FIGS. 3 and 4) extends from the base 23 and is provided with notches or separators 27 (FIG. 4) for maintaining separation between the disk substrates 11. The base 23 also may be configured or scaled to support one or more cassettes, each of which contains or supports a plurality of disk substrates 11. Thus, the AP deposition may be performed on the plurality of disk substrates 11 at the same time.

In the illustrated embodiment of FIG. 2, the system may further comprise a low vacuum gage 29, an AP reservoir 31, plumbing 33, valves 35, a vent 37, and a pump 39. A vapor diffuser 41 (FIG. 4) may be incorporated into the mandrel 25 for distributing the AP vapor in the evacuation chamber 21 during operation. The AP deposition may further comprise maintaining the AP at a selected temperature to control a vapor pressure of the AP, placing the disk substrates inside the evacuation chamber, and controlling an exposure time of the disk substrates to the AP.

Referring again to FIG. 1, the disk substrates 11 may be further and sequentially processed according to some embodiments of the method. For example, the method may comprise applying resist 51 to the disk substrates 11, imprinting a patterned master 53 on the disk substrates 11, curing the imprint (e.g., with UV light 55), releasing the patterned master as shown at reference numeral 57, etching the cured disk substrates with, e.g., reactive ions 59, and thus patterning the disk substrates, as indicated at reference numeral 61, for making the magnetic recording media 63. As described for other embodiments, this processing may further comprise loading a plurality of the magnetic recording media 63 into cassettes 65 (FIG. 5) prior to the lubrication deposition process shown in FIG. 5. Thus, the lubricant may be deposited on the plurality of magnetic recording media at the same time. Moreover, this step may include simultaneously coating both sides of the magnetic recording media with the lubricant.

Figure 5:
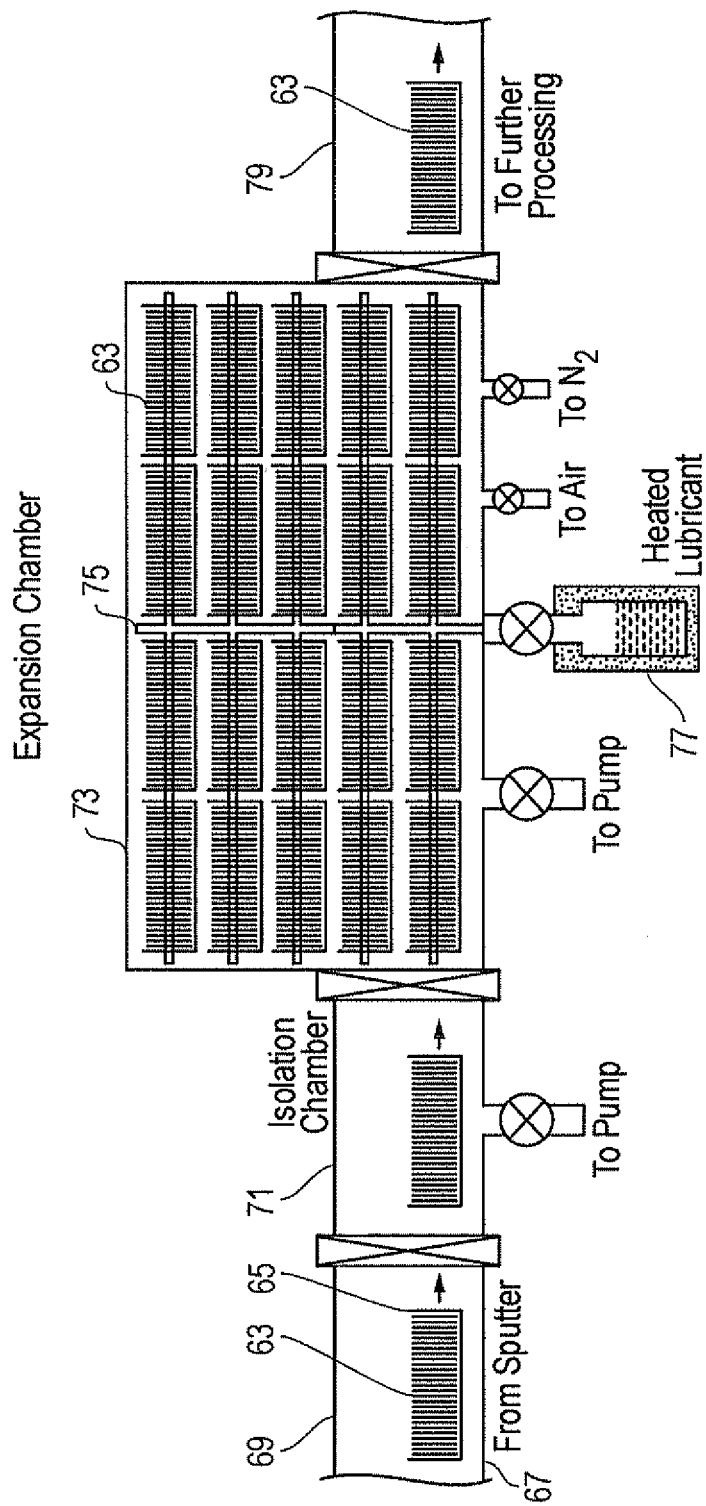
FIG. 5 is schematic diagram of a batch vapor deposition process for lubricant for the method of FIG. 1, and is constructed in accordance with the invention.

As shown in FIG. 5, the lubricant deposition process may further comprise transferring the magnetic recording media 63 on an evacuated conveyor 67 from a sputtering chamber 69 to an isolation chamber 71. Next, the magnetic recording media 63 is transferred to an exposure chamber 73, and may be arranged adjacent to vapor diffusing tubes 75. Exposure chamber 73 is evacuated and then filled with lubricant vapor from a lubricant reservoir 77.

Exposure of the magnetic recording media 63 is controlled to limit lubricant bonding thereto. For example, the exposure of the magnetic recording media to the lubricant vapor may be controlled such that a monolayer adsorption of lubricant reaches saturation at an ambient disk temperature. The magnetic recording media 63 is then unloaded from the exposure chamber 73 and relocated for further processing (e.g., processing, such as final tape polish (FTP; or pad burnish), glide testing, etc.), as indicated at reference numeral 79.

While the invention has been shown or described in only some of its forms, it should be apparent to those skilled in the art that it is not so limited, but is susceptible to various changes without departing from the scope of the invention.

What is claimed is:

1. A method of manufacturing magnetic recording media, comprising:
   (a) loading a plurality of disk substrates into a cassette;
   (b) batch vapor depositing an adhesion promoter (AP) on the plurality of disk substrates in the cassette at a same time; then
   (c) processing the plurality of disk substrates by: applying resist, imprinting a patterned master, curing the imprint, releasing the patterned master, etching, and then patterning the plurality of disk substrates to form a plurality of magnetic recording media; and then
   (d) loading the plurality of magnetic recording media in a cassette, and batch vapor depositing a lubricant on the plurality of magnetic recording media in the cassette at a same time, and the lubricant has a thickness on the order of a single molecule of the lubricant.

2. A method according to claim 1, wherein the magnetic recording media comprise nanoimprinted discrete track media and bit-patterned media.

3. A method according to claim 1, wherein step (b) comprises simultaneously coating both sides of the disk substrates with the AP, and step (d) comprises simultaneously coating both sides of the magnetic recording media with the lubricant.

4. A method according to claim 1, wherein step (b) further comprises maintaining the AP at a selected temperature to control a vapor pressure of the AP, placing the disk substrates inside a vacuum chamber, and controlling an exposure time of the disk substrates to the AP.

5. A method according to claim 1, wherein the steps of step (c) occur sequentially.

6. A method according to claim 1, wherein step (d) further comprises transferring the magnetic recording media on an evacuated conveyor from a sputtering chamber to an isolation chamber, and then transferring the magnetic recording media to an exposure chamber, arranging the magnetic recording media adjacent to vapor diffusing tubes, evacuating and then filling the exposure chamber with lubricant vapor, controlling exposure of the magnetic recording media to limit lubricant bonding thereto, and then unloading the magnetic recording media from the exposure chamber and relocating the magnetic recording media for further processing.

7. A method according to claim 6, wherein exposure of the magnetic recording media to the lubricant vapor is controlled such that a monolayer adsorption of lubricant reaches saturation at an ambient disk temperature.

8. A method of manufacturing magnetic recording media, comprising:
   (a) loading a plurality of disk substrates into a cassette;
   (b) batch vapor depositing an adhesion promoter (AP) on the plurality of disk substrates in the cassette at a same time; then
   (c) applying resist to the AP on the disk substrates, imprinting a patterned master on the disk substrates, curing the imprint, releasing the patterned master, etching the cured disk substrates, and then patterning the disk substrates to form a plurality of magnetic recording media; and then (d) loading the plurality of magnetic media into a cassette, and batch vapor depositing a lubricant on the plurality of magnetic recording media in the cassette at a same time, and the lubricant has a thickness on the order of a single molecule of the lubricant.

9. A method according to claim 8, wherein the magnetic recording media comprise nanoimprinted discrete track media and bit-patterned media.

10. A method according to claim 8, wherein step (b) comprises simultaneously coating both sides of the disk substrates with the AP, and step (d) comprises simultaneously coating both sides of the magnetic recording media with the lubricant.

11. A method according to claim 8, wherein step (b) further comprises maintaining the AP at a selected temperature to control a vapor pressure of the AP, placing the disk substrates inside a vacuum chamber, and controlling an exposure time of the disk substrates to the AP.

12. A method according to claim 8, wherein the steps of step (c) occur sequentially.

13. A method according to claim 8, wherein step (d) further comprises transferring the magnetic recording media on an evacuated conveyor from a sputtering chamber to an isolation chamber, and then transferring the magnetic recording media to an exposure chamber, arranging the magnetic recording media adjacent to vapor diffusing tubes, evacuating and then filling the exposure chamber with lubricant vapor, controlling exposure of the magnetic recording media to limit lubricant bonding thereto, and then unloading the magnetic recording media from the exposure chamber and relocating the magnetic recording media for further processing.

14. A method according to claim 13, wherein exposure of the magnetic recording media to the lubricant vapor is controlled such that a monolayer adsorption of lubricant reaches saturation at an ambient disk temperature.

\* \* \* \* \*